(12) United States Patent
Wei et al.

(10) Patent No.: US 11,979,894 B2
(45) Date of Patent: May 7, 2024

(54) SOFT RESOURCE AVAILABILITY INDICATION FOR INTEGRATED ACCESS AND BACKHAUL (IAB) OPERATION IN PAIRED SPECTRUM

(71) Applicant: Intel Corporation, Santa Clara, CA (US)

(72) Inventors: Lili Wei, Portland, OR (US); Qian Li, Beaverton, OR (US); Geng Wu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 119 days.

(21) Appl. No.: 17/308,457

(22) Filed: May 5, 2021

(65) Prior Publication Data

US 2021/0258968 A1    Aug. 19, 2021

Related U.S. Application Data

(60) Provisional application No. 63/021,426, filed on May 7, 2020.

(51) Int. Cl.
*H04W 72/53* (2023.01)
*H04L 5/14* (2006.01)
(Continued)

(52) U.S. Cl.
CPC ............... *H04W 72/53* (2023.01); *H04L 5/14* (2013.01); *H04L 27/26025* (2021.01); *H04W 72/0453* (2013.01); *H04W 72/23* (2023.01)

(58) Field of Classification Search
CPC . H04W 72/53; H04W 72/0453; H04W 72/23; H04L 5/14; H04L 27/26025;
(Continued)

(56) References Cited

U.S. PATENT DOCUMENTS

2020/0351847 A1* 11/2020 Kim .................... H04W 74/006
2021/0144718 A1* 5/2021 Jyothi .................. H04W 72/23
(Continued)

FOREIGN PATENT DOCUMENTS

CN         111083740 A  *  4/2020  ........... H04L 5/0053

OTHER PUBLICATIONS

3GPP, "Technical Specification Group Radio Access Network; NR; Study on Integrated Access and Backhaul; (Release 16)," 3GPP TR 38.874 V16.0.0 (Dec. 2018), 5G, 111 pages.
(Continued)

*Primary Examiner* — Yu-Wen Chang
(74) *Attorney, Agent, or Firm* — Schwabe, Williamson & Wyatt, P.C.

(57) ABSTRACT

Various embodiments herein include techniques to indicate a reference subcarrier spacing (SCS) in a soft resource availability configuration for an integrated access and backhaul (IAB) distributed unit (DU)/mobile terminal (MT). For example, the reference SCS may be included in soft resource availability radio resource control (RRC) configuration AvailabilityCombinationsPerCell. Additionally, embodiments include mechanisms for dynamic soft availability indication with paired spectrum operation (e.g., frequency division duplex (FDD) operation). Other embodiments may be described and claimed.

16 Claims, 7 Drawing Sheets

(51) Int. Cl.
*H04L 27/26* (2006.01)
*H04W 72/0453* (2023.01)
*H04W 72/23* (2023.01)

(58) Field of Classification Search
CPC ... H04L 5/005; H04L 5/0051; H04L 27/0006; H04L 5/001
See application file for complete search history.

(56) References Cited

U.S. PATENT DOCUMENTS

| | | | |
|---|---|---|---|
| 2021/0176746 A1* | 6/2021 | Abedini | H04W 28/18 |
| 2021/0227544 A1* | 7/2021 | Luo | H04L 27/2607 |
| 2022/0217661 A1* | 7/2022 | Yokomakura | H04B 7/155 |
| 2023/0337206 A1* | 10/2023 | Peng | H04W 72/23 |

OTHER PUBLICATIONS

3GPP, "RAN1 Chairman's Notes," 3GPP TSG RAN WG1 Meeting #94bis, Oct. 8-12, 2018, Chengdu, China, 143 pages.
3GPP, "RAN1 Chairman's Notes," 3GPP TSG RAN WG1 Meeting #96bis, Feb. 25-Mar. 1, 2019, Athens, Greece, 120 pages.
3GPP, "RAN1 Chairman's Notes," 3GPP TSG RAN WG1 Meeting #97bis, May 13-17, 2019, Reno, USA, 103 pages.
3GPP, "RAN1 Chairman's Notes," 3GPP TSG RAN WG1 Meeting #98bis, Oct. 14-20, 2019, Chongqing, China, 97 pages.
3GPP, "RAN1 Chairman's Notes," 3GPP TSG RAN WG1 Meeting #99, Nov. 18-22, 2019, Reno, USA, 133 pages.
Moderator (AT&T), "Summary of [100b-e-NR-IAB-02] regarding IAB-MT Resource/Control Channel Configuration," 3GPP TSG-RAN WG1 Meeting #100bis-e, R1-2002802, Agenda Item: 7.2.3.3, Apr. 20-Apr. 30, 2020, e-Meeting, 24 pages.
Moderator (AT&T), "Summary of [100b-e-NR-IAB-03] regarding IAB Operation in Paired Spectrum," 3GPP TSG-RAN WG1 Meeting #100bis-e, R1-2002803, Agenda Item: 7.2.3.3, Apr. 20-Apr. 30, 2020, e-Meeting, 8 pages.
Samsung, "Corrections on integrated access and backhaul," 3GPP TSG-RAN WG1 Meeting #100-e, R1-2001452, Change Request, 38.213 CR 0087 rev—Current version: 16.0.0, Feb. 24-Mar. 6, 2020, e-Meeting, 6 pages.
Ericsson, "38.331 CR on Integrated Access and Backhaul for NR," 3GPP TSG-RAN WG2 Meeting #109-e, R2-2002357, Change Request 38.331 CR 1471 rev 2 Current version: 15.8.0, Feb. 24-Mar. 6, 2020, Online, 68 pages.

* cited by examiner

SOFT RESOURCE AVAILABILITY INDICATION FOR INTEGRATED ACCESS AND BACKHAUL (IAB) OPERATION IN PAIRED SPECTRUM

CROSS REFERENCE TO RELATED APPLICATION

The present application claims priority to U.S. Provisional Patent Application No. 63/021,426, which was filed May 7, 2020, the disclosure of which is hereby incorporated by reference.

FIELD

Various embodiments generally may relate to the field of wireless communications.

BACKGROUND

In an integrated access and backhaul (IAB) network, an IAB distributed unit (DU) will have dynamic (D), uplink (U), and flexible (F) (referred to as D/U/F) resource types with a hard (H), soft (S), or not available (NA) (referred to as H/S/NA) indication with semi-static configuration. For semi-static configured soft D/U/F resources, dynamic soft availability indication is transmitted from parent node with downlink control information (DCI) format 2_5. In current IAB network configuration, the IAB node DU assumes a same subcarrier spacing (SCS) configuration for soft availability indication for a serving cell as an SCS configuration for its active downlink (DL) bandwidth part (BWP) or active uplink (UL) BWP.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
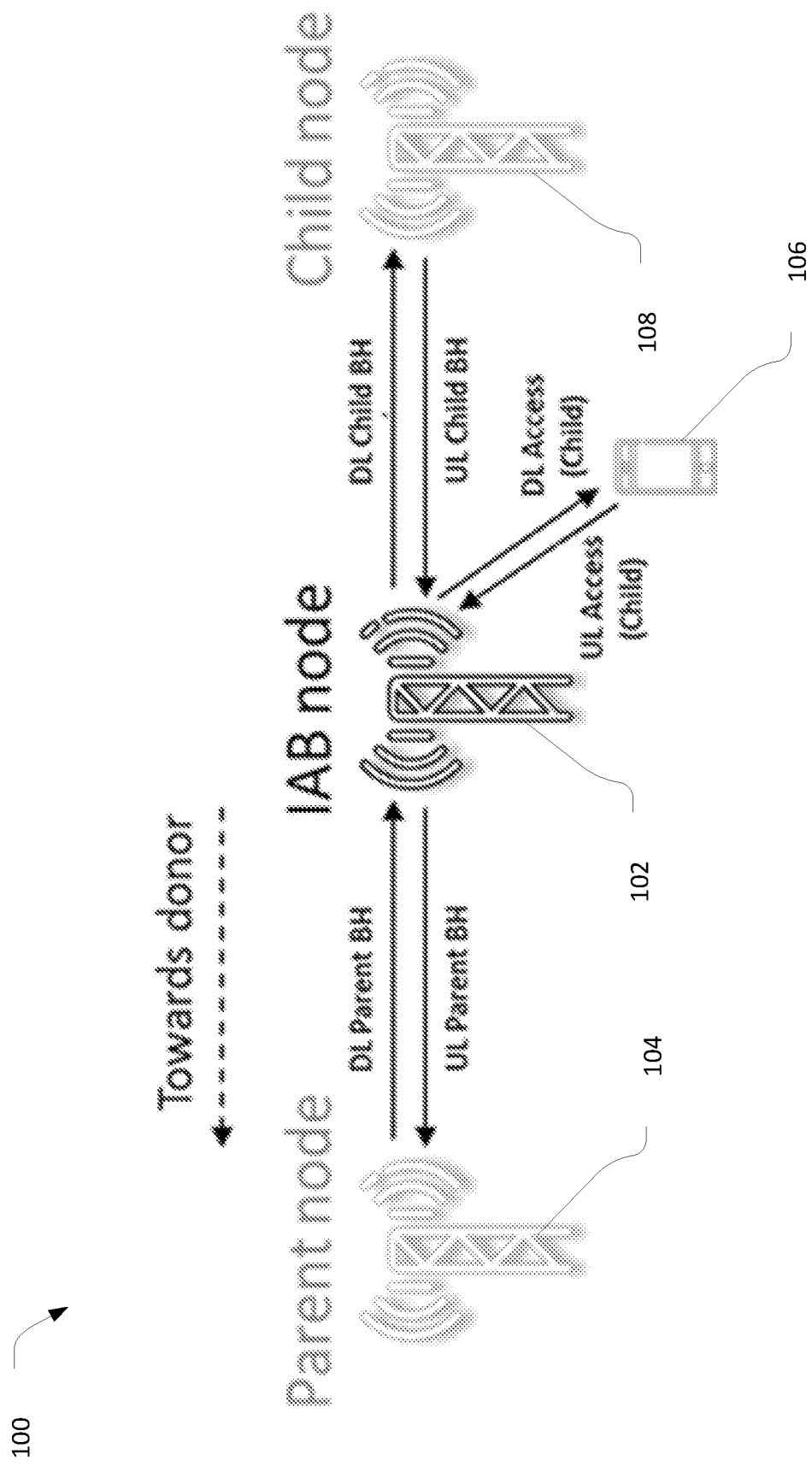
FIG. 1 illustrates an integrated access and backhaul (IAB) network that includes an IAB node, in accordance with various embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

In various embodiments herein, one or more reference SCSs may be indicated in the soft resource availability configuration for an IAB MT (e.g., in soft resource availability radio resource control (RRC) configuration AvailabilityCombinationsPerCell). The one or more reference SCSs may accommodate the case that one DCI Format 2_5 is sent to multiple IAB MTs and monitored in the common search space. Additionally, or alternatively, embodiments include mechanisms for soft availability indication (e.g., dynamic indication) with paired spectrum operation (e.g., frequency division duplex (FDD) operation).

In an IAB network, an IAB distributed unit (DU) may have dynamic (D), uplink (U), and flexible (F) (referred to as D/U/F) resource types with a hard (H), soft (S), or not available (NA) (referred to as H/S/NA) indication with semi-static configuration. For semi-static configured soft D/U/F resources, dynamic soft availability indication is transmitted from parent node with downlink control information (DCI) format 2_5. In current IAB network configuration, the IAB node DU assumes a same subcarrier spacing (SCS) configuration for soft availability indication for a serving cell as an SCS configuration for its active downlink (DL) bandwidth part (BWP) or active uplink (UL) BWP.

Current SCS assumption is based on that DCI Format 2_5 is monitored by an IAB MT in a UE(MT)-specific search space. However, DCI Format 2_5 can be monitored in a common search space. In this case, reference SCSs will be needed.

In addition, all the current soft availability indication procedures are related to unpaired spectrum operation (e.g., time division duplex (TDD) operation). There is no detailed specification related to soft availability indication to paired spectrum operation (e.g., FDD).

Accordingly, embodiments herein may include indication of one or more reference SCSs in the soft resource availability configuration for an IAB MT. Additionally, or alternatively, embodiments include mechanisms for soft availability indication with paired spectrum operation (e.g., FDD).

IAB Resource Multiplexing and Soft Availability Indication for Unpaired Spectrum FIG. 1 illustrates an IAB network 100 that includes an IAB node 102, in accordance with various embodiments. The IAB node 102 may connect to a parent IAB node 104 (e.g., an IAB donor or another IAB node) through parent backhaul (BH) link. Additionally, the IAB node 102 may connect to a child UE 106 through a child access (AC) link, and/or connect to a child IAB node 108 through a child BH link. Further aspects of the IAB network 100 may be described in 3GPP Technical Report (TR) 38.874, "NR; Study on integrated access and backhaul."

In current IAB network architectures, central unit (CU)/distributed unit (DU) split has been leveraged where each IAB node includes a DU and a Mobile-Termination (MT) function. Via the MT function, the IAB node connects to its parent IAB node or the IAB donor like a UE. Via the DU function, the IAB node communicates with its child UEs and child MTs like a base station. RRC signaling may be used between the CU in the IAB donor and the UE/MT, while F1AP signaling may be used between the CU and the DU in an IAB node.

In 3GPP RAN1 #94bis (see 3GPP RAN1 Meeting #94bis, RAN1 Chairman's Notes, Chengdu, China, October 2018), the following statements on DU/MT resource configuration types (D/U/F/NA/H/S) have been agreed:

From a MT point-of-view, the following time-domain resources can be indicated for the parent link as in NR Release-15 (D/U/F):
Downlink time resource,
Uplink time resource,
Flexible time resource
From a DU point-of-view, the child link has the following types of time-domain resources (D/U/F/NA)
Downlink time resource,
Uplink time resource,
Flexible time resource
Not available (NA) time resources (not to be used for communication on the DU child links)
For each of the downlink, uplink and flexible time-resource types of the DU child link, there are two flavors: hard and soft (H/S):
Hard: The corresponding time resource is always available for the DU child link
Soft: The availability of the corresponding time resource for the DU child link is explicitly and/or implicitly controlled by the parent node.

RAN1 #96 (see 3GPP RAN1 Meeting #96, RAN1 Chairman's Notes, Athens, Greece, March 2019) and RAN1 #97 (see 3GPP RAN1 Meeting #97, RAN1 Chairman's Notes, Reno, USA, May 2019) further gives description regarding soft DU resources, including the support for explicit indication of soft resource availability.

In case of soft DU resources:
If the soft resource is indicated as available, the DU can assume it can use the resource
If the soft resource is not indicated as available, the DU cannot assume it can use the resource
If a DU NA or Soft resource is configured with cell-specific signals/channels, the resource is treated as if it were a Hard DU resource. The list of cell-specific signals/channels includes:
resources for SSB transmission at DU, including both CD-SSB and non-CD-SSB;
configured RACH occasions for receiving at the DU
periodic CSI-RS transmission at the DU
scheduled resource for receiving SR at DU
Both implicit and explicit indication of the availability of soft resources at an IAB node is supported
In case of implicit indication of DU soft-resource availability, the IAB node knows that the DU resource can be used without impacting the MTs ability to transmit/receive according to its configuration and scheduling based on indirect means.
Explicit indication that a resource is available is based on DCI indication.

In RAN1 #98bis (see 3GPP RAN1 #98bis, Chairman's Note, Chongqing, China, October 2019) and RAN1 #99 (3GPP RAN1 #99, Chairman's Note, Reno, USA, November 2019), the new downlink control information (DCI) format 2_5 has been defined to indicate DU-IA (DU indication of available (IA) for soft resources).

A DCI following the DCI Format 2_0 structure is used to indicate DU-IA to an IAB node using a new IA-RNTI [(radio network temporary identifier)] different from [slot format indicator (SFI)]-RNTI.

This DCI contains one or multiple fields (similar to SFI-index fields in DCI Format 2_0), each field value is used as the index in a RRC configured AI (Availability Indicator) AvailabilityCombination table (similar to the SFI SlotFormatCombination table).

Each entry in the AI AvailabilityCombination table indicates the resource availability for a set of consecutive slots.

Each element of each entry in the AI AvailabilityCombination table indicates the resource availability in a slot.

The resource availability can take 8 values:

TABLE 1 soft resource availability value and meaning for one slot

| Value | Meaning |
|---|---|
| 0 | D soft resources: no indication of availability<br>U soft resources: no indication of availability<br>F soft resource: no indication of availability |
| 1 | D soft resources: indicated available<br>U soft resources: no indication of availability<br>F soft resource: no indication of availability |
| 2 | D soft resources: no indication of availability<br>U soft resources: indicated available<br>F soft resource: no indication of availability |
| 3 | D soft resources: indicated available<br>U soft resources: indicated available<br>F soft resource: no indication of availability |
| 4 | D soft resources: no indication of availability<br>U soft resources: no indication of availability<br>F soft resource: indicated available |
| 5 | D soft resources: indicated available<br>U soft resources: no indication of availability<br>F soft resource: indicated available |
| 6 | D soft resources: no indication of availability<br>U soft resources: indicated available<br>F soft resource: indicated available |
| 7 | D soft resources: indicated available<br>U soft resources: indicated available<br>F soft resource: indicated available |

The maximum number of entries in the AI AvailabilityCombination table is 512.

In RAN2 #109e (see 3GPP RAN2 #109e, R2-2002357, "38.331 CR on Integrated Access and Backhaul for NR", March 2020), the following RRC signaling related to soft resource indication has been defined as shown below. Note that "xxx-r16" means the parameter for 3GPP specification release 16, and it is omitted in the following parameter description for ease of understanding.

Similar to DCI format 2_0, DCI format 2_5 carries message to dynamically indicate the availability for D/U/F soft resources within the RRC-configured table, constructed from a set of predefined availability values for D/U/F soft resources in one slot duration as provided in Table 1 herein. The IAB DU may receive configuration information for soft-resource availability indication via RRC. One example RRC message is shown below.

```
Availability Indicator-r16 ::=   SEQUENCE {
    ai-RNTI-r16              AI-RNTI-r16,
    dci-PayloadSize-AI-r16       INTEGER (1..maxAI-DCI-PayloadSize),
       availableCombToAddModList-r16  SEQUENCE
(SIZE(1..maxNrofAssociatedDUCellsPerMT-r16)) OF
                         AvailabilityCombinationsPerCell-r16    OPTIONAL,
    availableCombToReleaseList-r16 SEQUENCE (SIZE(1..maxNrofDUCells-r16)) OF
CellIdentity
                                                          OPTIONAL,
    ...
}
AI-RNTI-r16 ::=           RNTI-Value
maxAI-DCI-PayloadSize-r16       INTEGER ::= 128
AvailabilityCombinationsPerCell-r16 ::=   SEQUENCE {
    iabDuCellId-AI-r16         IAB-DU-CellID-AI-r16,
    positionInDCI-AI-r16           INTEGER(0..maxAI-DCI-PayloadSize-r16-1)
OPTIONAL,
    availabilityCombinations-r16      SEQUENCE (SIZE
(1..maxNrofAvailabilityCombinationsPerSet))
                           OF AvailibilityCombination-r16,
    ...
}
maxNrofAvailabilityCombinationsPerSet-r16   INTEGER ::= 512
AvailabilityCombination-r16 ::=       SEQUENCE
    availabilityCombinationId-r16  Availability CombinationId-r16,
       resourceAvailability-r16  SEQUENCE
(SIZE(1..maxNrofResourceAvailabilityPerCombination-r16))
                           OF INTEGER (0..7)
}
IAB-DU-CellID-AI-r16 ::=         CellIdentity,
AvailabilityCombinationId-r16 ::=     INTEGER
(0..maxNrofAvailabilityCombinationsPerSet-r16-1)
maxNrofResourceAvailabilityPerCombination-r16  INTEGER ::= 64
```

Some description can further be found in 3GPP RAN1 #100e, R1-2001452, "38.213 CR on Integrated Access and Backhaul", March 2020. Soft resource availability indication procedure is based on the combination of several semi-static RRC parameters and dynamic DCI format 2_5 message. The RRC information element (IE) Availability-Indicator provides an IAB MT with AI-RNTI by RRC parameter ai-RNTI and a payload size of DCI format 2_5 (up to 128 bits) by RRC parameter dci-PayloadSize-AI.

For each serving cell of an IAB-node DU in a set of serving cells of the IAB-node DU, the RRC IE AvailabilityCombinationsPerCell provides the IAB-node DU:

an identity of the IAB-node DU serving cell by iabDu-CellId-AI a location of an availability indicator (AI) index field in DCI format 2_5 by positionInDCI-AI a set of availability indication value combinations by RRC parameter availabilityCombinations. The total number of availability indication value combinations in a serving cell does not exceed 512. Each availability combination in the set of availability combinations includes resourceAvailability indicating availability of soft symbols in one or more slots (up to 64) for the IAB-node DU serving cell, and a mapping for the soft symbol availability combinations provided by resourceAvailability to a corresponding AI index field value in DCI format 2_5 provided by availabilityCombinationId An AI index field value in a DCI format 2_5 indicates to an IAB-node DU a soft symbol availability in each slot for a number of slots starting from a slot where the IAB-node detects the DCI format 2_5. An availability for a soft symbol in a slot is identified by a corresponding value resourceAvailability as provided in Table 1 herein.

The IAB-node DU can assume a same SCS configuration for availabilityCombinations for a serving cell as an SCS configuration provided by IAB-DU-Resource-Configuration-TDD-Config for the serving cell.

However, the above SCS assumption is based on that DCI Format 2_5 is monitored by an IAB MT in a UE(MT)-specific search space. There can be cases that soft resources become available to multiple IAB nodes with the same parent, then common search space can be applied. For example, the DCI Format 2_5 may be monitored in a common search space. In this case, reference SCSs will be needed.

In addition, all the above soft availability indication procedures are related to unpaired spectrum operation (e.g., TDD). Currently there is no detailed specification related to soft availability indication to paired spectrum operation (e.g., FDD).

Accordingly, embodiments herein include to add reference SCSs in soft resource availability RRC configuration AvailabilityCombinationsPerCell. The reference SCSs may accommodate the case that one DCI Format 2_5 is sent to multiple IAB MTs and monitored in the common search space. Additionally, or alternatively, embodiments include mechanisms to apply soft availability indication to paired spectrum operation (e.g., FDD).

Reference SCSs in Soft Resource Availability RRC Configuration AvailabilityCombinationsPerCell In various embodiments, reference SCSs may be included in the RRC IE AvailabilityCombinationsPerCell for soft resource availability indication. One example of the indication of the reference SCSs is shown below.

```
AvailabilityCombinationsPerCell-r16 ::=   SEQUENCE
iabDuCellId-AI-r16            IAB-DU-CellID-AI-r16,
   subcarrierSpacing-AI-r16       SubcarrierSpacing,
   subcarrierSpacing2-AI-r16      SubcarrierSpacing           OPTIONAL,
     positionInDCI-AI-r16          INTEGER(0..maxAI-DCI-PayloadSize-r16-1)
OPTIONAL,
   availabilityCombinations-r16   SEQUENCE (SIZE
(1..maxNrofAvailabilityCombinationsPerSet))
                                           OF AvailibilityCombination-r16,
   ...
   }
```

For Unpaired Spectrum Operation

A reference SCS configuration $\mu$ AI may be indicated by RRC IE subcarrierSpacing-AI. Additionally, when a supplementary UL carrier is configured for the serving cell, a reference SCS configuration $\mu_{AI,SUL}$ may be indicated by RRC IE subcarrierSpacing2-AI for the supplementary UL carrier.

For an IAB MT on a serving cell, the IAB MT may be provided (e.g., in subcarrierSpacing-AI) a reference SCS configuration $\mu_{AI}$ for each availability indication value in a combination of availability indication values indicated by AI index field value in DCI format 2_5. Aspects of various embodiments may include one or more of:

The IAB MT expects that for a reference SCS configuration $\mu_{AI}$ and for an active DL BWP or an active UL BWP with SCS configuration $\mu$, it is $\mu \geq \mu_{AI}$.

Each availability indication value in the combination of availability indication values indicated by the AI-index field value in DCI format 2_5 is applicable to $2^{(\mu-\mu_{AI})}$ consecutive slots in the active DL BWP or the active UL BWP where the first slot starts at a same time as a first slot for the reference SCS configuration.

For an IAB MT with a second UL carrier on a serving cell, embodiments may include one or more of the following aspects:

The IAB MT expects to be additionally provided a reference SCS configuration $\mu_{AI,SUL}$ so that for an active UL BWP in the second UL carrier with SCS configuration $\mu_{SUL}$, it is $\mu_{SUL} \geq \mu_{AI,SUL}$.

The AI index field value in DCI format 2_5 indicates a combination of availability indication values that includes a combination of availability indication values for a reference first UL carrier of the serving cell and a combination of slot format for a reference second UL carrier of the serving cell.

The IAB MT is provided by subcarrierSpacing a reference SCS configuration $\mu_{AI}$ for the combination of availability indication values indicated by the AI index field in DCI format 2_5 for the reference first UL carrier of the serving cell.

The IAB MT is provided by subcarrierSpacing2 a reference SCS configuration $\mu_{AI,SUL}$ for the combination of availability indication values indicated by the AI index field in DCI format 2_5 for the reference second UL carrier of the serving cell.

For each $2^{(\mu_{AI}-\mu_{AI,SUL})}+1$ values of availability indication, the first $2^{(\mu_{AI}-\mu_{AI,SUL})}$ values for the combination of availability indications are applicable to the reference first UL carrier and the next value is applicable to the reference second UL carrier.

Each availability indication for a combination of availability indication values indicated by the AI index field in DCI format 2_5 for the reference first UL carrier is applicable to $2^{(\mu-\mu_{AI})}$ consecutive slots for the active DL BWP and the active UL BWP in the first UL carrier where the first slot starts at a same time as a first slot in the reference first UL carrier.

Each availability indication for the combination of availability indication values for the reference second UL carrier is applicable to $2^{(\mu_{SUL}-\mu_{AI,SUL})}$ consecutive slots for the active UL BWP in the second UL carrier where the first slot starts at a same time as a first slot in the reference second UL carrier.

For Paired Spectrum Operation

A reference SCS configuration $\mu_{AI,DL}$ for a DL BWP may be indicated by RRC IE subcarrierSpacing-AI and/or a reference SCS configuration $\mu_{AI,UL}$ for an UL BWP may be indicated by by RRC IE subcarrierSpacing2-AI.

Various embodiments may include one or more of the following aspects:

When an IAB MT is provided a reference SCS configuration $\mu_{AI,DL}$, for an active DL BWP with SCS configuration $\mu_{DL}$, it is $\mu_{DL} \geq \mu_{AI,DL}$.

When an IAB MT is provided a reference SCS configuration $\mu_{AI,UL}$, for an active UL BWP with SCS configuration $\mu_{UL}$, it is $\mu_{UL} \geq \mu_{AI,UL}$.

Each availability indication for a combination of availability indication values indicated by the AI index field value in DCI format 2_5 for the reference DL BWP, is applicable to $2^{(\mu_{DL}-\mu_{AI,DL})}$ consecutive slots for the active DL BWP where the first slot starts at a same time as a first slot in the reference DL BWP. Each downlink or flexible symbol for the reference SCS configuration corresponds to $2^{(\mu_{DL}-\mu_{AI,DL})}$ consecutive downlink or flexible symbols for the SCS configuration $\mu_{DL}$.

Each availability indication for a combination of availability indication values indicated by the AI index field value in DCI format 2_5 for the reference UL BWP, is applicable to $2^{(\mu_{UL}-\mu_{AI,UL})}$ consecutive slots for the active UL BWP where the first slot starts at a same time as a first slot in the reference UL BWP. Each uplink or flexible symbol for the reference SCS configuration corresponds to $2^{(\mu_{DL}-\mu_{AI,DL})}$ consecutive downlink or flexible symbols for the SCS configuration $\mu$ tn.

Different soft resource availability indication mechanisms for paired spectrum will be discussed in more detail below.

Note that a reference SCS configuration $\mu_{AI}$, or $\mu_{AI,DL}$, or $\mu_{AI,UL}$, or $\mu_{AI,SUL}$ may be either 0, or 1, or 2 for FR1 and is either 2 or 3 for FR2.

Soft Resource Availability Indication for Paired Spectrum

Various embodiments may include one or more of several mechanisms for soft resource availability indication for paired spectrum.

Mechanism 1: Separate Multi-Slot Availability Indication Values into DL BWP and UL BWP.

For an IAB MT on a serving cell for paired spectrum operation, the AI index filed in DCI format 2_5 indicates a combination of availability indication values that includes a combination of availability indication values for a reference DL BWP and a combination of availability indication values for a reference UL BWP of the serving cell.

The IAB MT is provided (e.g., in subcarrierSpacing) a reference SCS configuration $\mu_{AI,DL}$ for the combination of availability indication values indicated by the AI index field value in DCI format 2_5 for the reference DL BWP of the serving cell.

The IAB MT is provided (e.g., in subcarrierSpacing2) a reference SCS configuration $\mu_{AI,UL}$ for the combination of availability indication values indicated by the AI index field value in DCI format 2_5 for the reference UL BWP of the serving cell. Embodiments may include one or more of the following aspects:

- If $\mu_{AI,DL} \geq \mu_{AI,UL}$: for each $2^{(\mu_{AI,DL}-\mu_{AI,UL})}+1$ values provided by resourceAvailability, the first $2^{(\mu_{AI,DL}-\mu_{AI,UL})}$ values for the combination of availability indication values are applicable to the reference DL BWP and the next value is applicable to the reference UL BWP.
- If $\mu_{AI,DL} < \mu_{AI,UL}$: for each $2^{(\mu_{AI,UL}-\mu_{AI,DL})}+1$ values provided by resourceAvailability, the first value for the combination of availability indication values are applicable to the reference DL BWP and the next 2 values are applicable to the reference UL BWP.

Accordingly, if DL reference SCS>UL reference SCS (K times), the first K values in the (K+1) values may correspond to the availability indication for the K DL reference slots, and the last value may correspond to one UL reference slot. If UL reference SCS>DL reference SCS (K times), the first value in the (K+1) values may correspond to the availability indication for the DL reference slot, and the last K values may correspond to the K UL reference slots. In case of same DL/UL reference SCS, even location availability indication value may be for DL BWP, and odd location availability indication value may be for UL BWP.

For availability indication value in Table 1 for DL reference slots, an IAB MT may ignore availability indication related to UL soft resources. For availability indication value in Table 1 for UL reference slots, an IAB MT may ignore availability indication related to DL soft resources.

Mechanism 2: Separate DCI Format 2_5 Payload into DL and UL Payload

The payload size of DCI format 2_5 (e.g., up to 128 bits) is configured by RRC parameter dci-PayloadSize-AI. In embodiments, the DCI format 2_5 payload may be separated into DL and UL payload. Some example techniques for splitting the payload into separate DL and UL payloads are described further below. In embodiments, the maxAI-DCI-PayloadSize RRC setting may remain as 128 or may be increased (e.g., to 256).

Similarly, for availability indication value in Table 1 for DL reference slots, an IAB MT may ignore availability indication related to UL soft resources. For availability indication value in Table 1 for UL reference slots, an IAB MT may ignore availability indication related to DL soft resources.

Option 2-1: DCI Format 2_5 Payload Carry DL and UL Payload Alternatively

In this option, the DCI format 2_5 payload may be consecutively separated into multiple groups. Each group may have availability indication for DL BWP and UL BWP. Aspects of embodiments may include one or more of:

- If $\mu_{AI,DL} \geq \mu_{AI,UL}$: for each DCI format 2_5 AI-index field payload group of length $2^{(\mu_{AI,DL}-\mu_{AI,UL})}+1$, the first $2^{(\mu_{AI,DL}-\mu_{AI,UL})}$ values are applicable to the reference DL BWP and the next value is applicable to the reference UL BWP.
- If $\mu_{AI,DL} < \mu_{AI,UL}$: for each DCI format 2_5 AI-index field payload group of length $2^{(\mu_{AI,UL}-\mu_{AI,DL})}+1$, the first value for the combination of availability indication values is applicable to the reference DL BWP and the next $2^{(\mu_{AI,DL}-\mu_{AI,UL})}$ values are applicable to the reference UL BWP.

Option 2-2: DCI Format 2_5 Payload Carries UL Payload after all DL Indication Finished In this option, the DCI format 2_5 payload may carry availability indication for DL BWP. After all DL indication finished, it will carry availability indication for UL BWP. For the payload size of DCI format 2_5 (denoted as "PSize") configured by RRC parameter dci-PayloadSize-AI, the DCI 2_t payload size parameter. Aspects of embodiments may include one or more of:

- If $\mu_{AI,DL} \geq \mu_{AI,UL}$: separate the DCI format 2_5 payload size PSize into two parts, the first $\lfloor PSize*2^{(\mu_{AI,DL}-\mu_{AI,UL})}/(2^{(\mu_{AI,DL}-\mu_{AI,UL})}+1) \rfloor$ values apply for DL BWP, the next $\lfloor PSize/(2^{(\mu_{AI,DL}-\mu_{AI,UL})}+1) \rfloor$ values apply for UL BWP.
- If $\mu_{AI,DL} < \mu_{AI,UL}$: separate the DCI format 2_5 payload size PSize into two parts, the first $\lfloor PSize/(2^{(\mu_{AI,UL}-\mu_{AI,DL})}+1) \rfloor$ values apply for DL BWP, the next $\lfloor PSize*2^{(\mu_{AI,UL}-\mu_{AI,DL})}/(2^{(\mu_{AI,UL}-\mu_{AI,DL})}+1) \rfloor$ values apply for UL BWP.

Mechanism 3: Extend Soft Resource Availability Value from 0-7 to 0-15.

For paired spectrum for IAB, the DU resource configuration framework may be extended to include two separate per-cell D/U/F and H/S/NA configurations provided for DL and UL, respectively.

Accordingly, for DL spectrum, there may be downlink (D) and downlink flexible (DF) resources with H/SNA indication, which means there will be downlink soft and downlink flexible (DF) soft for semi-static soft resources of DL spectrum. Similarly, there may be uplink soft and uplink flexible (UF) soft resources for semi-static soft resources of UL spectrum.

Then, for soft resource availability indication value 0-7 as in Table 1, when there are downlink flexible (DF) soft symbols and uplink flexible (UF) soft symbols in the same slot, the "F" indication meaning cannot differentiate whether it indicates "DF" or "UF" soft availability.

Accordingly, in some embodiments, any availability indication of "F" in Table 1 may apply to both downlink flexible and uplink flexible soft symbols in the same slot.

In other embodiments, Table 1 may be modified to generate Table 2, as shown below. Table 2 may include indication value from 0-15 to extend more cases to differentiate "DF" and "UF" soft availability.

TABLE 2 soft resource availability value and meaning for one slot for paired spectrum

| Value | Meaning |
|---|---|
| 0 | D soft resources: no indication of availability<br>DF soft resource: no indication of availability<br>U soft resources: no indication of availability<br>UF soft resource: no indication of availability |
| 1 | D soft resources: indicated available<br>DF soft resource: no indication of availability<br>U soft resources: no indication of availability<br>UF soft resource: no indication of availability |
| 2 | D soft resources: no indication of availability<br>DF soft resource: indicated available<br>U soft resources: no indication of availability<br>UF soft resource: no indication of availability |
| 3 | D soft resources: indicated available<br>DF soft resource: indicated available<br>U soft resources: no indication of availability<br>UF soft resource: no indication of availability |

TABLE 2-continued soft resource availability value and meaning for one slot for paired spectrum

| Value | Meaning |
|---|---|
| 4 | D soft resources: no indication of availability<br>DF soft resource: no indication of availability<br>U soft resources: indicated available<br>UF soft resource: no indication of availability |
| 5 | D soft resources: indicated available<br>DF soft resource: no indication of availability<br>U soft resources: indicated available<br>UF soft resource: no indication of availability |
| 6 | D soft resources: no indication of availability<br>DF soft resource: indicated available<br>U soft resources: indicated available<br>UF soft resource: no indication of availability |
| 7 | D soft resources: indicated available<br>DF soft resource: indicated available<br>U soft resources: indicated available<br>UF soft resource: no indication of availability |
| 8 | D soft resources: no indication of availability<br>DF soft resource: no indication of availability<br>U soft resources: no indication of availability<br>UF soft resource: indicated available |
| 9 | D soft resources: indicated available<br>DF soft resource: no indication of availability<br>U soft resources: no indication of availability<br>UF soft resource: indicated available |
| 10 | D soft resources: no indication of availability<br>DF soft resource: indicated available<br>U soft resources: no indication of availability<br>UF soft resource: indicated available |
| 11 | D soft resources: indicated available<br>DF soft resource: indicated available<br>U soft resources: no indication of availability<br>UF soft resource: indicated available |
| 12 | D soft resources: no indication of availability<br>DF soft resource: no indication of availability<br>U soft resources: indicated available<br>UF soft resource: indicated available |
| 13 | D soft resources: indicated available<br>DF soft resource: no indication of availability<br>U soft resources: indicated available<br>UF soft resource: indicated available |
| 14 | D soft resources: no indication of availability<br>DF soft resource: indicated available<br>U soft resources: indicated available<br>UF soft resource: indicated available |
| 15 | D soft resources: indicated available<br>DF soft resource: indicated available<br>U soft resources: indicated available<br>UF soft resource: indicated available |

Note that the value-to-meaning correspondence in Table 2 does not need to be strictly followed. In other words, the 0-15 values and the 16 meanings listed in the table may be switched to create a new Table and can still be applied in soft availability indication for IAB operation in paired spectrum, in accordance with various embodiments herein.

For availability indication for slots with only D and DF soft resources or slots with only U and UF soft resources, an IAB MT may ignore U/UF indication for slots with only D and DF soft resources, and/or ignore D/DF indication for slots with only U and UF soft resources.

In various embodiments, the RRC IE AvailabilityCombination may be modified for the new soft availability indication value range for paired spectrum. One example is shown below.

```
AvailabilityCombination-r16 ::=      SEQUENCE
    availability CombinationId-r16   AvailabilityCombinationId-r16,
    resourceAvailability-r16   SEQUENCE
    (SIZE(1..maxNrofResourceAvailabilityPerCombination-r16))
                                     OF INTEGER (0..7)        OPTIONAL,
    resourceAvailability-FDD-r16 SEQUENCE
    SIZE(1..maxNrofResourceAvailabilityPerCombination-r16)
                                     OF INTEGER (0..15)       OPTIONAL,
}
```

Systems and Implementations

Figure 2:
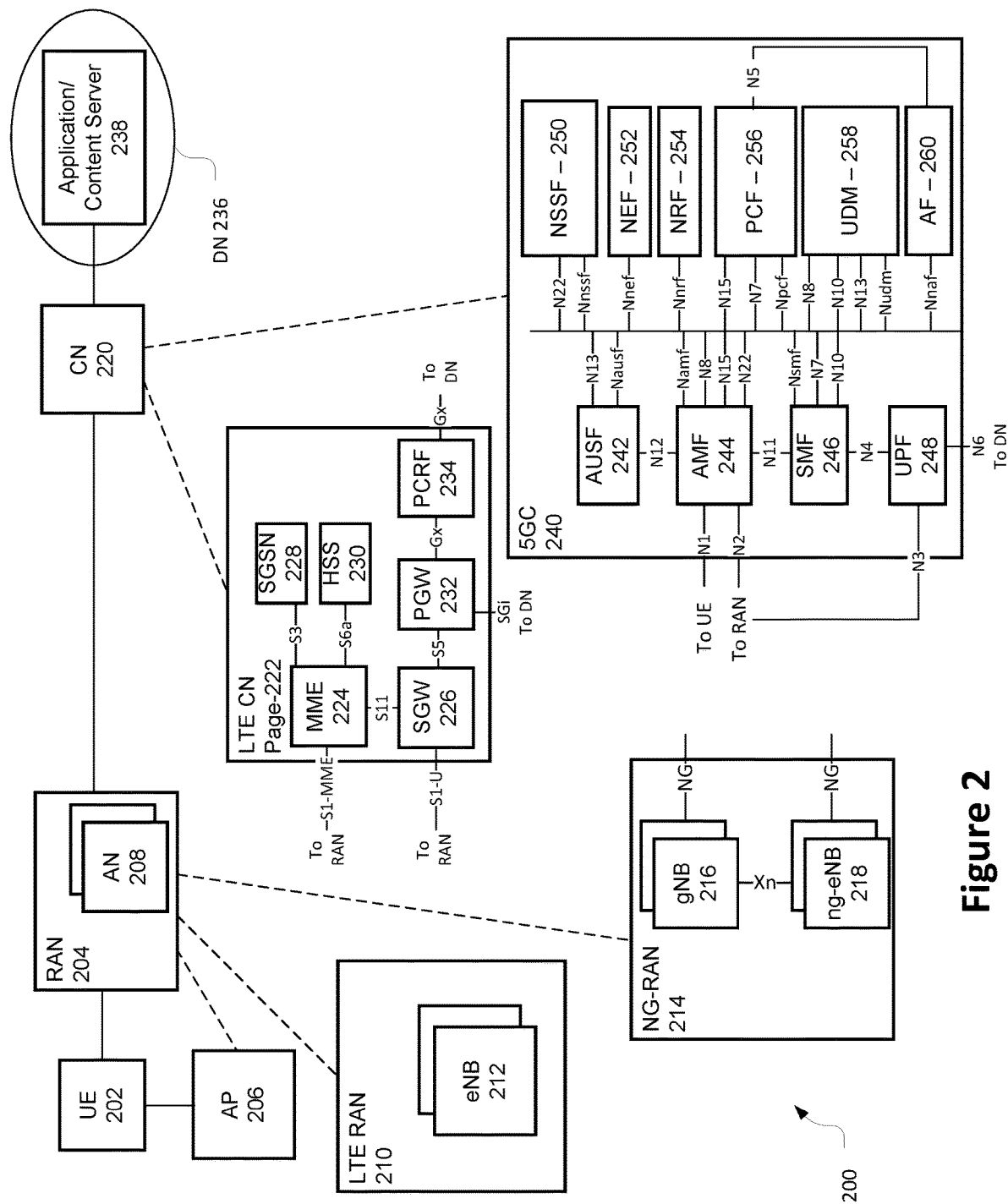
FIG. 2 schematically illustrates a wireless network in accordance with various embodiments.
Figure 3:
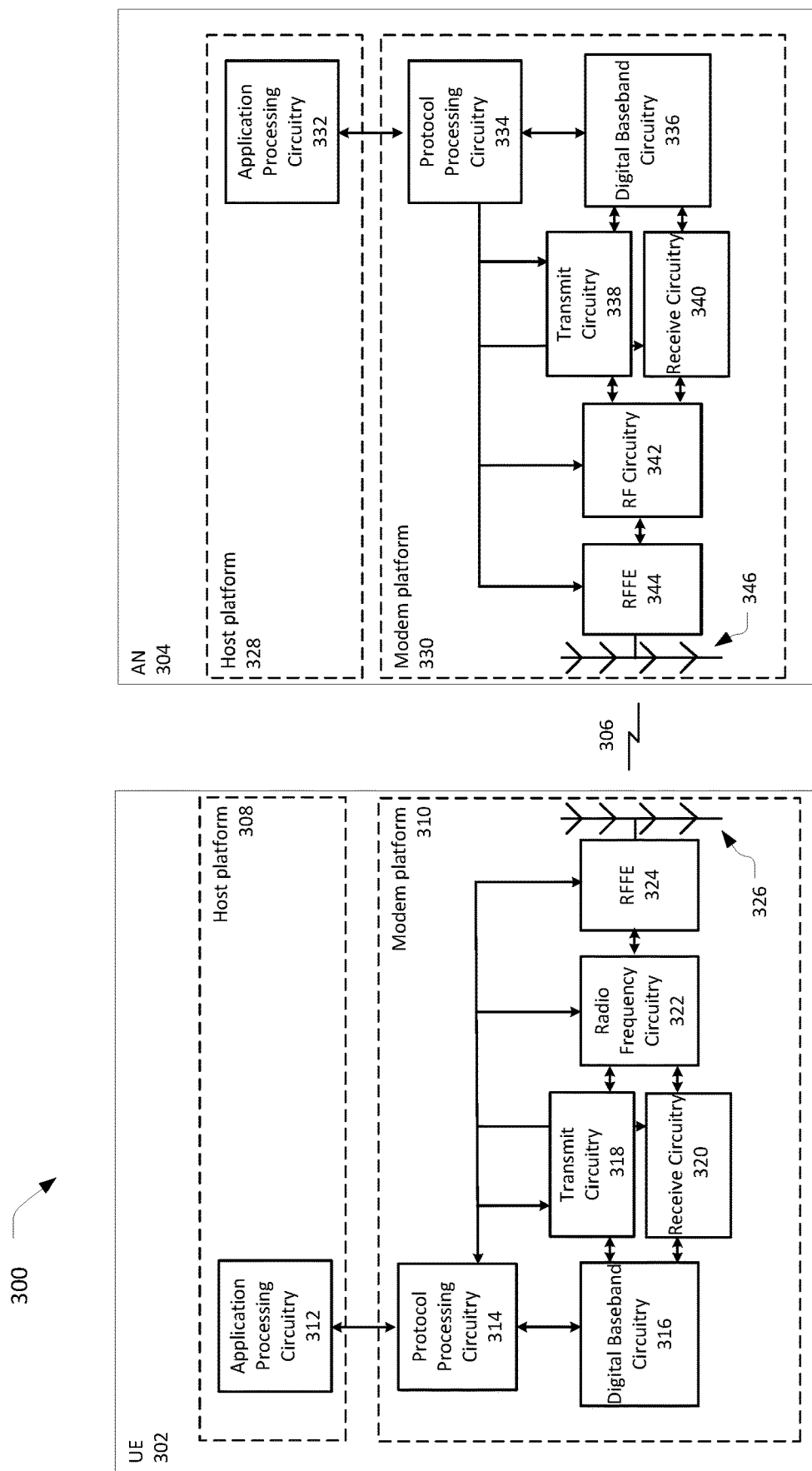
FIG. 3 schematically illustrates components of a wireless network in accordance with various embodiments.
Figure 4:
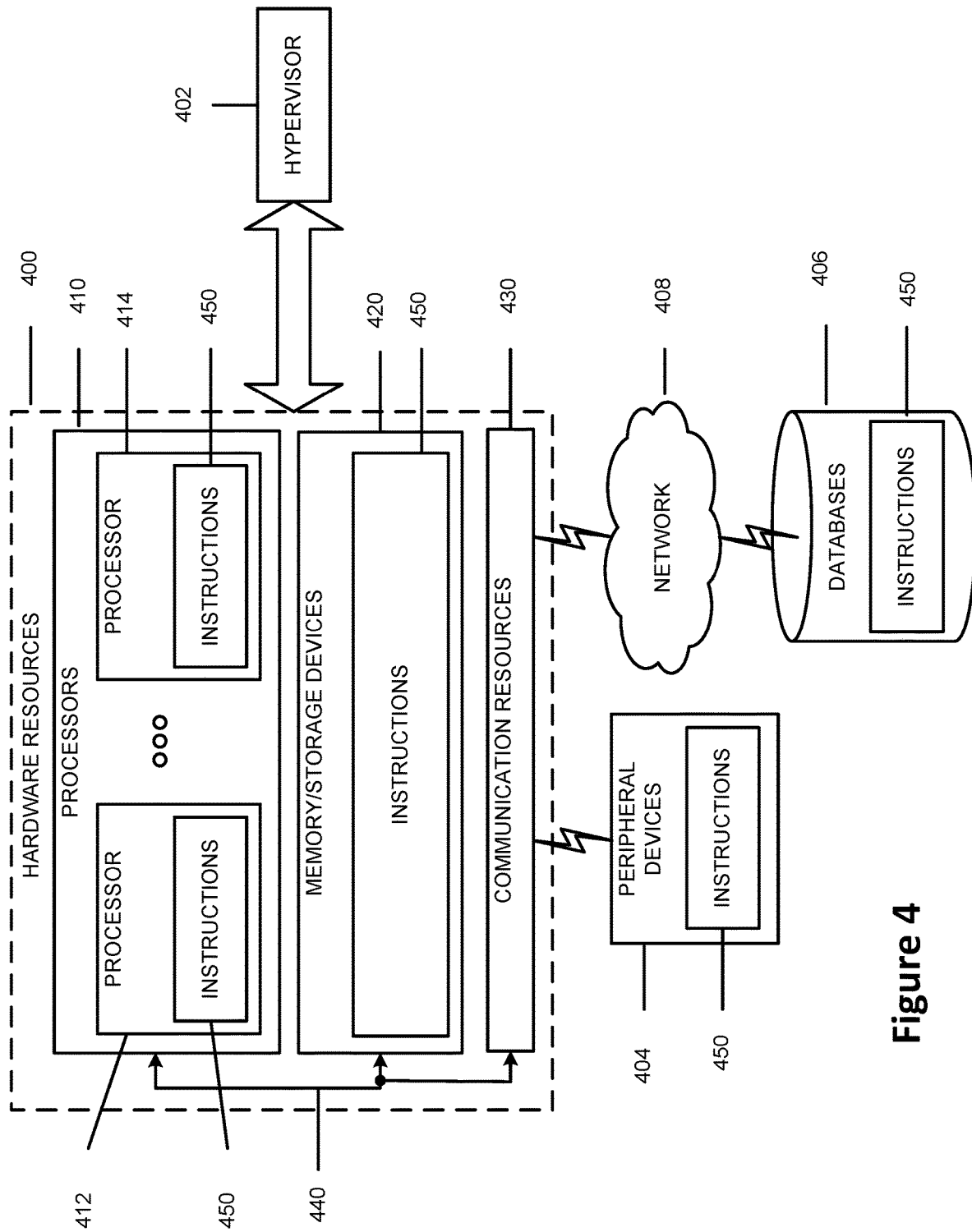
FIG. 4 is a block diagram illustrating components, according to some example embodiments, able to read instructions from a machine-readable or computer-readable medium (e.g., a non-transitory machine-readable storage medium) and perform any one or more of the methodologies discussed herein.

FIGS. 2-4 illustrate various systems, devices, and components that may implement aspects of disclosed embodiments.

FIG. 2 illustrates a network 200 in accordance with various embodiments. The network 200 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 200 may include a UE 202, which may include any mobile or non-mobile computing device designed to communicate with a RAN 204 via an over-the-air connection. The UE 202 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 200 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc.

In some embodiments, the UE 202 may additionally communicate with an AP 206 via an over-the-air connection. The AP 206 may manage a WLAN connection, which may serve to offload some/all network traffic from the RAN 204. The connection between the UE 202 and the AP 206 may be consistent with any IEEE 802.11 protocol, wherein the AP 206 could be a wireless fidelity (Wi-Fi®) router. In some embodiments, the UE 202, RAN 204, and AP 206 may utilize cellular-WLAN aggregation (for example, LWA/LWIP). Cellular-WLAN aggregation may involve the UE 202 being configured by the RAN 204 to utilize both cellular radio resources and WLAN resources.

The RAN 204 may include one or more access nodes, for example, AN 208. AN 208 may terminate air-interface protocols for the UE 202 by providing access stratum protocols including RRC, PDCP, RLC, MAC, and L1 protocols. In this manner, the AN 208 may enable data/voice connectivity between CN 220 and the UE 202. In some embodiments, the AN 208 may be implemented in a discrete device or as one or more software entities running on server computers as part of, for example, a virtual network, which may be referred to as a CRAN or virtual baseband unit pool. The AN 208 be referred to as a BS, gNB, RAN node, eNB, ng-eNB, NodeB, RSU, TRxP, TRP, etc. The AN 208 may be a macrocell base station or a low power base station for providing femtocells, picocells or other like cells having smaller coverage areas, smaller user capacity, or higher bandwidth compared to macrocells.

In embodiments in which the RAN 204 includes a plurality of ANs, they may be coupled with one another via an X2 interface (if the RAN 204 is an LTE RAN) or an Xn interface (if the RAN 204 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 204 may each manage one or more cells, cell groups, component carriers, etc. to provide the UE 202 with an air interface for network access. The UE 202 may be simultaneously connected with a plurality of cells provided by the same or different ANs of the RAN 204. For example, the UE 202 and RAN 204 may use carrier aggregation to allow the UE 202 to connect with a plurality of component carriers, each corresponding to a Pcell or Scell. In dual connectivity scenarios, a first AN may be a master node that provides an MCG and a second AN may be secondary node that provides an SCG. The first/second ANs may be any combination of eNB, gNB, ng-eNB, etc.

The RAN 204 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LB T) protocol.

In V2X scenarios the UE 202 or AN 208 may be or act as a RSU, which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In some embodiments, the RAN 204 may be an LTE RAN 210 with eNBs, for example, eNB 212. The LTE RAN 210 may provide an LTE air interface with the following characteristics: SCS of 15 kHz; CP-OFDM waveform for DL and SC-FDMA waveform for UL; turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operating on sub-6 GHz bands.

In some embodiments, the RAN 204 may be an NG-RAN 214 with gNBs, for example, gNB 216, or ng-eNBs, for example, ng-eNB 218. The gNB 216 may connect with 5G-enabled UEs using a 5G NR interface. The gNB 216 may connect with a 5G core through an NG interface, which may include an N2 interface or an N3 interface. The ng-eNB 218 may also connect with the 5G core through an NG interface, but may connect with a UE via an LTE air interface. The gNB 216 and the ng-eNB 218 may connect with each other over an Xn interface.

In some embodiments, the NG interface may be split into two parts, an NG user plane (NG-U) interface, which carries traffic data between the nodes of the NG-RAN 214 and a UPF 248 (e.g., N3 interface), and an NG control plane (NG-C) interface, which is a signaling interface between the nodes of the NG-RAN214 and an AMF 244 (e.g., N2 interface).

The NG-RAN 214 may provide a 5G-NR air interface with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use PBCH DMRS for PBCH demodulation; PTRS for phase tracking for PDSCH; and tracking reference signal for time tracking. The 5G-NR air interface may operating on FR1 bands that include sub-6 GHz bands or FR2 bands that include bands from 24.25 GHz to 52.6 GHz. The 5G-NR air interface may include an SSB that is an area of a downlink resource grid that includes PSS/SSS/PBCH.

In some embodiments, the 5G-NR air interface may utilize BWPs for various purposes. For example, BWP can be used for dynamic adaptation of the SCS. For example, the UE 202 can be configured with multiple BWPs where each BWP configuration has a different SCS. When a BWP change is indicated to the UE 202, the SCS of the transmission is changed as well. Another use case example of BWP is related to power saving. In particular, multiple BWPs can be configured for the UE 202 with different amount of frequency resources (for example, PRBs) to support data transmission under different traffic loading scenarios. A BWP containing a smaller number of PRBs can be used for data transmission with small traffic load while allowing power saving at the UE 202 and in some cases at the gNB 216. A BWP containing a larger number of PRBs can be used for scenarios with higher traffic load.

The RAN 204 is communicatively coupled to CN 220 that includes network elements to provide various functions to support data and telecommunications services to customers/subscribers (for example, users of UE 202). The components of the CN 220 may be implemented in one physical node or separate physical nodes. In some embodiments, NFV may be utilized to virtualize any or all of the functions provided by the network elements of the CN 220 onto physical compute/storage resources in servers, switches, etc. A logical instantiation of the CN 220 may be referred to as a network slice, and a logical instantiation of a portion of the CN 220 may be referred to as a network sub-slice.

In some embodiments, the CN 220 may be an LTE CN 222, which may also be referred to as an EPC. The LTE CN 222 may include MME 224, SGW 226, SGSN 228, HSS 230, PGW 232, and PCRF 234 coupled with one another over interfaces (or "reference points") as shown. Functions of the elements of the LTE CN 222 may be briefly introduced as follows.

The MME 224 may implement mobility management functions to track a current location of the UE 202 to facilitate paging, bearer activation/deactivation, handovers, gateway selection, authentication, etc.

The SGW 226 may terminate an Si interface toward the RAN and route data packets between the RAN and the LTE CN 222. The SGW 226 may be a local mobility anchor point for inter-RAN node handovers and also may provide an anchor for inter-3GPP mobility. Other responsibilities may include lawful intercept, charging, and some policy enforcement.

The SGSN 228 may track a location of the UE 202 and perform security functions and access control. In addition, the SGSN 228 may perform inter-EPC node signaling for mobility between different RAT networks; PDN and S-GW selection as specified by MME 224; MME selection for handovers; etc. The S3 reference point between the MME 224 and the SGSN 228 may enable user and bearer information exchange for inter-3GPP access network mobility in idle/active states.

The HSS 230 may include a database for network users, including subscription-related information to support the network entities' handling of communication sessions. The HSS 230 can provide support for routing/roaming, authentication, authorization, naming/addressing resolution, location dependencies, etc. An S6a reference point between the HSS 230 and the MME 224 may enable transfer of subscription and authentication data for authenticating/authorizing user access to the LTE CN 220.

The PGW 232 may terminate an SGi interface toward a data network (DN) 236 that may include an application/content server 238. The PGW 232 may route data packets between the LTE CN 222 and the data network 236. The PGW 232 may be coupled with the SGW 226 by an S5 reference point to facilitate user plane tunneling and tunnel management. The PGW 232 may further include a node for policy enforcement and charging data collection (for example, PCEF). Additionally, the SGi reference point between the PGW 232 and the data network 2 36 may be an operator external public, a private PDN, or an intra-operator packet data network, for example, for provision of IMS services. The PGW 232 may be coupled with a PCRF 234 via a Gx reference point.

The PCRF 234 is the policy and charging control element of the LTE CN 222. The PCRF 234 may be communicatively coupled to the app/content server 238 to determine appropriate QoS and charging parameters for service flows. The PCRF 232 may provision associated rules into a PCEF (via Gx reference point) with appropriate TFT and QCI.

In some embodiments, the CN 220 may be a 5GC 240. The 5GC 240 may include an AUSF 242, AMF 244, SMF 246, UPF 248, NSSF 250, NEF 252, NRF 254, PCF 256, UDM 258, and AF 260 coupled with one another over interfaces (or "reference points") as shown. Functions of the elements of the 5GC 240 may be briefly introduced as follows.

The AUSF 242 may store data for authentication of UE 202 and handle authentication-related functionality. The AUSF 242 may facilitate a common authentication framework for various access types. In addition to communicating with other elements of the 5GC 240 over reference points as shown, the AUSF 242 may exhibit an Nausf service-based interface.

The AMF 244 may allow other functions of the 5GC 240 to communicate with the UE 202 and the RAN 204 and to subscribe to notifications about mobility events with respect to the UE 202. The AMF 244 may be responsible for registration management (for example, for registering UE 202), connection management, reachability management, mobility management, lawful interception of AMF-related events, and access authentication and authorization. The AMF 244 may provide transport for SM messages between the UE 202 and the SMF 246, and act as a transparent proxy for routing SM messages. AMF 244 may also provide transport for SMS messages between UE 202 and an SMSF. AMF 244 may interact with the AUSF 242 and the UE 202 to perform various security anchor and context management functions. Furthermore, AMF 244 may be a termination point of a RAN CP interface, which may include or be an N2 reference point between the RAN 204 and the AMF 244; and the AMF 244 may be a termination point of NAS (N1) signaling, and perform NAS ciphering and integrity protection. AMF 244 may also support NAS signaling with the UE 202 over an N3 IWF interface.

The SMF 246 may be responsible for SM (for example, session establishment, tunnel management between UPF 248 and AN 208); UE IP address allocation and management (including optional authorization); selection and control of UP function; configuring traffic steering at UPF 248 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 244 over N2 to AN 208; and determining SSC mode of a session. SM may refer to management of a PDU session, and a PDU session or "session" may refer to a PDU connectivity service that provides or enables the exchange of PDUs between the UE 202 and the data network 236.

The UPF 248 may act as an anchor point for intra-RAT and inter-RAT mobility, an external PDU session point of interconnect to data network 236, and a branching point to support multi-homed PDU session. The UPF 248 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 248 may include an uplink classifier to support routing traffic flows to a data network.

The NSSF 250 may select a set of network slice instances serving the UE 202. The NSSF 250 may also determine allowed NSSAI and the mapping to the subscribed S-NSSAIs, if needed. The NSSF 250 may also determine the AMF set to be used to serve the UE 202, or a list of candidate AMFs based on a suitable configuration and possibly by querying the NRF 254. The selection of a set of network slice instances for the UE 202 may be triggered by the AMF 244 with which the UE 202 is registered by interacting with the NSSF 250, which may lead to a change of AMF. The NSSF 250 may interact with the AMF 244 via an N22 reference point; and may communicate with another NSSF in a visited network via an N31 reference point (not shown). Additionally, the NSSF 250 may exhibit an Nnssf service-based interface.

The NEF 252 may securely expose services and capabilities provided by 3GPP network functions for third party, internal exposure/re-exposure, AFs (e.g., AF 260), edge computing or fog computing systems, etc. In such embodiments, the NEF 252 may authenticate, authorize, or throttle the AFs. NEF 252 may also translate information exchanged with the AF 260 and information exchanged with internal network functions. For example, the NEF 252 may translate between an AF-Service-Identifier and an internal 5GC information. NEF 252 may also receive information from other NFs based on exposed capabilities of other NFs. This information may be stored at the NEF 252 as structured data, or at a data storage NF using standardized interfaces. The stored information can then be re-exposed by the NEF 252 to other NFs and AFs, or used for other purposes such as analytics. Additionally, the NEF 252 may exhibit an Nnef service-based interface.

The NRF 254 may support service discovery functions, receive NF discovery requests from NF instances, and provide the information of the discovered NF instances to the NF instances. NRF 254 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 254 may exhibit the Nnrf service-based interface.

The PCF 256 may provide policy rules to control plane functions to enforce them, and may also support unified policy framework to govern network behavior. The PCF 256 may also implement a front end to access subscription information relevant for policy decisions in a UDR of the UDM 258. In addition to communicating with functions over reference points as shown, the PCF 256 exhibit an Npcf service-based interface.

The UDM 258 may handle subscription-related information to support the network entities' handling of communication sessions, and may store subscription data of UE 202. For example, subscription data may be communicated via an N8 reference point between the UDM 258 and the AMF 244. The UDM 258 may include two parts, an application front end and a UDR. The UDR may store subscription data and policy data for the UDM 258 and the PCF 256, and/or structured data for exposure and application data (including PFDs for application detection, application request information for multiple UEs 202) for the NEF 252. The Nudr service-based interface may be exhibited by the UDR 221 to allow the UDM 258, PCF 256, and NEF 252 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 258 may exhibit the Nudm service-based interface.

The AF 260 may provide application influence on traffic routing, provide access to NEF, and interact with the policy framework for policy control.

In some embodiments, the 5GC 240 may enable edge computing by selecting operator/$3^{rd}$ party services to be geographically close to a point that the UE 202 is attached to the network. This may reduce latency and load on the network. To provide edge-computing implementations, the 5GC 240 may select a UPF 248 close to the UE 202 and execute traffic steering from the UPF 248 to data network 236 via the N6 interface. This may be based on the UE subscription data, UE location, and information provided by the AF 260. In this way, the AF 260 may influence UPF (re)selection and traffic routing. Based on operator deployment, when AF 260 is considered to be a trusted entity, the network operator may permit AF 260 to interact directly with relevant NFs. Additionally, the AF 260 may exhibit an Naf service-based interface.

The data network 236 may represent various network operator services, Internet access, or third party services that may be provided by one or more servers including, for example, application/content server 238.

FIG. 3 schematically illustrates a wireless network 300 in accordance with various embodiments. The wireless network 300 may include a UE 302 in wireless communication with an AN 304. The UE 302 and AN 304 may be similar to, and substantially interchangeable with, like-named components described elsewhere herein.

The UE 302 may be communicatively coupled with the AN 304 via connection 306. The connection 306 is illustrated as an air interface to enable communicative coupling, and can be consistent with cellular communications protocols such as an LTE protocol or a 5G NR protocol operating at mmWave or sub-6 GHz frequencies.

The UE 302 may include a host platform 308 coupled with a modem platform 310. The host platform 308 may include application processing circuitry 312, which may be coupled with protocol processing circuitry 314 of the modem platform 310. The application processing circuitry 312 may run various applications for the UE 302 that source/sink application data. The application processing circuitry 312 may further implement one or more layer operations to transmit/receive application data to/from a data network. These layer operations may include transport (for example UDP) and Internet (for example, IP) operations The protocol processing circuitry 314 may implement one or more of layer operations to facilitate transmission or reception of data over the connection 306. The layer operations implemented by the protocol processing circuitry 314 may include, for example, MAC, RLC, PDCP, RRC and NAS operations.

The modem platform 310 may further include digital baseband circuitry 316 that may implement one or more layer operations that are "below" layer operations performed by the protocol processing circuitry 314 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 310 may further include transmit circuitry 318, receive circuitry 320, RF circuitry 322, and RF front end (RFFE) 324, which may include or connect to one or more antenna panels 326. Briefly, the transmit circuitry 318 may include a digital-to-analog converter, mixer, intermediate frequency (IF) components, etc.; the receive circuitry 320 may include an analog-to-digital converter, mixer, IF components, etc.; the RF circuitry 322 may include a low-noise amplifier, a power amplifier, power tracking components, etc.; RFFE 324 may include filters (for example, surface/bulk acoustic wave filters), switches, antenna tuners, beamforming components (for example, phase-array antenna components), etc. The selection and arrangement of the components of the transmit circuitry 318, receive circuitry 320, RF circuitry 322, RFFE 324, and antenna panels 326 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 314 may include one or more instances of control circuitry (not shown) to provide control functions for the transmit/receive components.

A UE reception may be established by and via the antenna panels 326, RFFE 324, RF circuitry 322, receive circuitry 320, digital baseband circuitry 316, and protocol processing circuitry 314. In some embodiments, the antenna panels 326 may receive a transmission from the AN 304 by receive-beamforming signals received by a plurality of antennas/antenna elements of the one or more antenna panels 326.

A UE transmission may be established by and via the protocol processing circuitry 314, digital baseband circuitry 316, transmit circuitry 318, RF circuitry 322, RFFE 324, and antenna panels 326. In some embodiments, the transmit components of the UE 304 may apply a spatial filter to the data to be transmitted to form a transmit beam emitted by the antenna elements of the antenna panels 326.

Similar to the UE 302, the AN 304 may include a host platform 328 coupled with a modem platform 330. The host platform 328 may include application processing circuitry 332 coupled with protocol processing circuitry 334 of the modem platform 330. The modem platform may further include digital baseband circuitry 336, transmit circuitry 338, receive circuitry 340, RF circuitry 342, RFFE circuitry 344, and antenna panels 346. The components of the AN 304 may be similar to and substantially interchangeable with like-named components of the UE 302. In addition to performing data transmission/reception as described above, the components of the AN 308 may perform various logical functions that include, for example, RNC functions such as radio bearer management, uplink and downlink dynamic radio resource management, and data packet scheduling.

FIG. 4 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 4 shows a diagrammatic representation of hardware resources 400 including one or more processors (or processor cores) 410, one or more memory/storage devices 420, and one or more communication resources 430, each of which may be communicatively coupled via a bus 440 or other interface circuitry. For embodiments where node virtualization (e.g., NFV) is utilized, a hypervisor 402 may be executed to provide an execution environment for one or more network slices/sub-slices to utilize the hardware resources 400.

The processors 410 may include, for example, a processor 412 and a processor 414. The processors 410 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 420 may include main memory, disk storage, or any suitable combination thereof. The memory/storage devices 420 may include, but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 430 may include interconnection or network interface controllers, components, or other suitable devices to communicate with one or more peripheral devices 404 or one or more databases 406 or other network elements via a network 408. For example, the communication resources 430 may include wired communication components (e.g., for coupling via USB, Ethernet, etc.), cellular communication components, NFC components, Bluetooth® (or Bluetooth® Low Energy) components, Wi-Fi® components, and other communication components.

Instructions 450 may comprise software, a program, an application, an applet, an app, or other executable code for causing at least any of the processors 410 to perform any one or more of the methodologies discussed herein. The instructions 450 may reside, completely or partially, within at least one of the processors 410 (e.g., within the processor's cache memory), the memory/storage devices 420, or any suitable combination thereof. Furthermore, any portion of the instructions 450 may be transferred to the hardware resources 400 from any combination of the peripheral devices 404 or the databases 406. Accordingly, the memory of processors 410, the memory/storage devices 420, the peripheral devices 404, and the databases 406 are examples of computer-readable and machine-readable media.

Example Procedures

Figure 5:
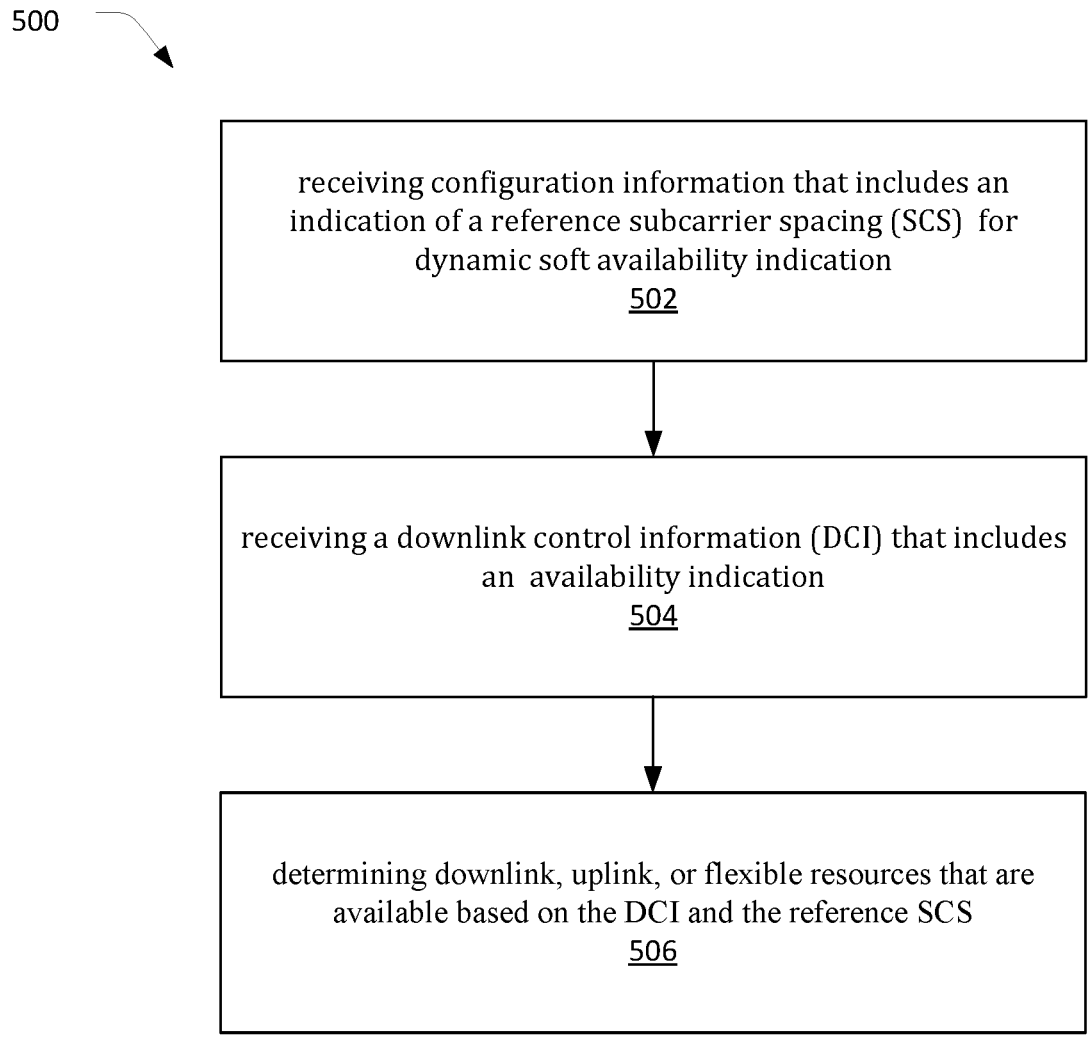
FIG. 5 is a flowchart of an example process that may be performed by an IAB DU, in accordance with various embodiments.

In some embodiments, the electronic device(s), network(s), system(s), chip(s) or component(s), or portions or implementations thereof, of FIGS. 2-4, or some other figure herein, may be configured to perform one or more processes, techniques, or methods as described herein, or portions thereof. One such process 500 is depicted in FIG. 5. The process 500 may be performed by an integrated access and backhaul (IAB) distributed unit (DU). For example, the process 500 may include, at 502, receiving configuration information that includes an indication of a reference subcarrier spacing (SCS) for dynamic soft availability indication.

The process 500 may further include, at 504, receiving a downlink control information (DCI) that includes an availability indication. The DCI may be received in a common search space or a UE-specific search space. The availability indication may include a plurality of availability indication values to indicate whether one or more downlink, uplink, and/or flexible resources are available. The resources may be TDD or FDD (e.g., unpaired or paired spectrum) resources.

The process 500 may further include, at 506, determining downlink, uplink, or flexible resources that are available based on the availability indication and the reference SCS.

Figure 6:
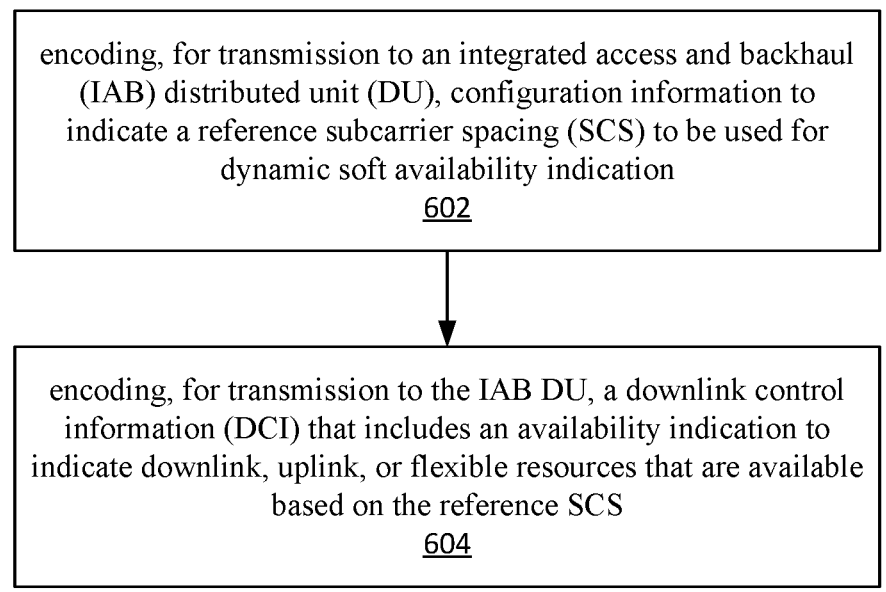
FIG. 6 is a flowchart of an example process that may be performed by a parent IAB node or a non-IAB next generation NodeB (gNB), in accordance with various embodiments.

FIG. 6 illustrates another process 600 in accordance with various embodiments. In some embodiments, the process 600 may be performed by a parent IAB node (e.g., a donor node or another IAB node) or a non-IAB gNB, or a portion thereof. The process 600 may include, at 602, encoding, for transmission to an integrated access and backhaul (IAB) distributed unit (DU), configuration information that includes an indication of a reference subcarrier spacing (SCS) for dynamic soft availability indication.

At 604, the process 600 may further include encoding, for transmission to the IAB DU, a downlink control information (DCI) that includes an availability indication to indicate downlink, uplink, or flexible resources that are available based on the reference SCS. The DCI may be transmitted in a common search space or a UE-specific search space. The availability indication may include a plurality of availability indication values to indicate whether one or more downlink, uplink, and/or flexible resources are available. The resources may be TDD or FDD (e.g., unpaired or paired spectrum) resources.

Figure 7:
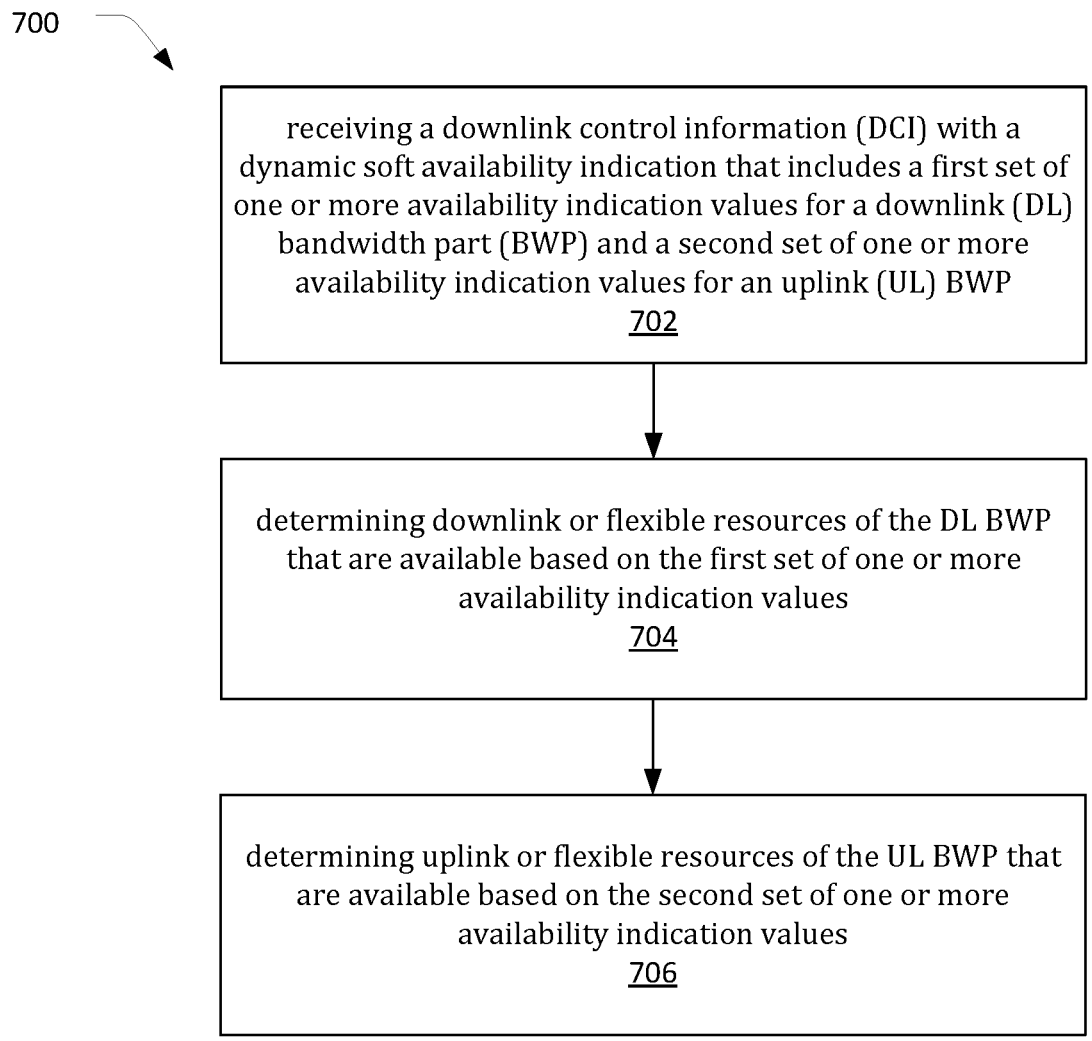
FIG. 7 is a flowchart of another example process that may be performed by an IAB DU, in accordance with various embodiments.

FIG. 7 illustrates another process 700 in accordance with various embodiments. The process 700 may be performed by an IAB DU or a portion thereof. At 702, the process 700 may include receiving a downlink control information (DCI) with a dynamic soft availability indication that includes a first set of one or more availability indication values for a downlink (DL) bandwidth part (BWP) and a second set of one or more availability indication values for an uplink (UL) BWP. At 704, the process 700 may include determining downlink or flexible resources of the DL BWP that are available based on the first set of one or more availability indication values. At 706, the process 700 may further include determining uplink or flexible resources of the UL BWP that are available based on the second set of one or more availability indication values.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example 1 may include to add reference SCSs in soft resource availability RRC configuration AvailabilityCombinationsPerCell. Aspects of example 1 may include one or more of:

For unpaired spectrum operation: A reference SCS configuration $\mu_{AI}$ by subcarrierSpacing-AI and, when a supplementary UL carrier is configured for the serving cell, a reference SCS configuration $\mu_{AI,SUL}$ by subcarrierSpacing2-AI for the supplementary UL carrier.

For an IAB MT on a serving cell provided by subcarrierSpacing-AI a reference SCS configuration $\mu_{AI}$, The IAB MT expects that for a reference SCS configuration $\mu_{AI}$ and for an active DL BWP or an active UL BWP with SCS configuration $\mu$, it is $\mu \geq \mu_{AI}$.

Each availability indication value in the combination of availability indication values indicated by the AI-index field value in DCI format 2_5 is applicable to $2^{(\mu-\mu_{AI})}$ consecutive slots in the active DL BWP or the active UL BWP where the first slot starts at a same time as a first slot for the reference SCS configuration.

For an IAB MT with a second UL carrier on a serving cell,

The IAB MT expects to be additionally provided a reference SCS configuration $\mu_{AI,SUL}$ so that for an active UL BWP in the second UL carrier with SCS configuration $\mu_{SUL}$, it is $\mu_{SUL} \geq \mu_{AI,SUL}$.

The IAB MT is provided by subcarrierSpacing a reference SCS configuration $\mu_{AI}$ for the combination of availability indication values indicated by the AI index field in DCI format 2_5 for the reference first UL carrier of the serving cell.

The IAB MT is provided by subcarrierSpacing2 a reference SCS configuration $\mu_{AI,SUL}$ for the combination of availability indication values indicated by the AI index field in DCI format 2_5 for the reference second UL carrier of the serving cell.

For each $2^{(\mu_{AI}-\mu_{AI,SUL})}+1$ values of availability indication, the first $2^{(\mu_{AI}-\mu_{AI,SUL})}$ values for the combination of availability indications are applicable to the reference first UL carrier and the next value is applicable to the reference second UL carrier.

Each availability indication for a combination of availability indication values indicated by the AI index field in DCI format 2_5 for the reference first UL carrier is applicable to $2^{(\mu-\mu_{AI})}$ consecutive slots for the active DL BWP and the active UL BWP in the first UL carrier where the first slot starts at a same time as a first slot in the reference first UL carrier.

Each availability indication for the combination of availability indication values for the reference second UL carrier is applicable to $2^{(\mu_{SUL}-\mu_{AI,SUL})}$ consecutive slots for the active UL BWP in the second UL carrier where the first slot starts at a same time as a first slot in the reference second UL carrier.

For paired spectrum operation: A reference SCS configuration $\mu_{AI,DL}$ for a DL BWP by subcarrierSpacing-AI and a reference SCS configuration $\mu_{AI,UL}$ for an UL BWP by subcarrierSpacing2-AI.

When an IAB MT is provided a reference SCS configuration $\mu_{AI,DL}$, for an active DL BWP with SCS configuration $\mu_{DL}$, it is $\mu_{DL} \geq \mu_{AI,DL}$.

When an IAB MT is provided a reference SCS configuration $\mu_{AI,UL}$, for an active UL BWP with SCS configuration $\mu_{UL}$, it is $\mu_{UL} \geq \mu_{AI,UL}$.

Each availability indication for a combination of availability indication values indicated by the AI index field value in DCI format 2_5 for the reference DL BWP, is applicable to $2^{(\mu_{DL}-\mu_{AI,DL})}$ consecutive slots for the active DL BWP where the first slot starts at a same time as a first slot in the reference DL BWP. Each downlink or flexible symbol for the reference SCS configuration corresponds to $2^{(\mu_{DL}-\mu_{AI,DL})}$ consecutive downlink or flexible symbols for the SCS configuration $\mu_{DL}$.

Each availability indication for a combination of availability indication values indicated by the AI index field value in DCI format 2_5 for the reference UL BWP, is applicable to $2^{(\mu_{UL}-\mu_{AI,UL})}$ consecutive slots for the active UL BWP where the first slot starts at a same time as a first slot in the reference UL BWP. Each uplink or flexible symbol for the reference SCS configuration corresponds to $2^{(\mu_{DL}-\mu_{AI,DL})}$ consecutive downlink or flexible symbols for the SCS configuration $\mu_{UL}$.

Note that a reference SCS configuration $\mu_{AI}$, or $\mu_{AI,DL}$, or $\mu_{AI,UL}$, or $\mu_{AI,SUL}$ is either 0, or 1, or 2 for FR1 and is either 2 or 3 for FR2.

Example 2 may include soft resource availability indication mechanisms for paired spectrum, comprising one or more of:

Mechanism 1: Separate multi-slot availability indication values into DL BWP and UL BWP.

If $\mu_{AI,DL} \geq \mu_{AI,UL}$: for each $2^{(\mu_{AI,DL}-\mu_{AI,UL})}+1$ values provided by resourceAvailability, the first $2^{(\mu_{AI,DL}-\mu_{AI,UL})}$ values for the combination of availability indication values are applicable to the reference DL BWP and the next value is applicable to the reference UL BWP.

If $\mu_{AI,DL} < \mu_{AI,UL}$: for each $2^{(\mu_{AI,UL}-\mu_{AI,DL})}+1$ values provided by resourceAvailability, the first value for the combination of availability indication values are applicable to the reference DL BWP and the next $2^{(\mu_{AI,DL}-\mu_{AI,UL})}$ values are applicable to the reference UL BWP.

Mechanism 2: Separate DCI format 2_5 payload into DL and UL payload

Option 2-1: DCI format 2_5 payload carry DL and UL payload alternatively

If $\mu_{AI,DL} \geq \mu_{AI,UL}$: for each DCI format 2_5 AI-index field payload group of length $2^{(\mu_{AI,DL}-\mu_{AI,UL})}+1$, the first $2^{(\mu_{AI,DL}-\mu_{AI,UL})}$ values are applicable to the reference DL BWP and the next value is applicable to the reference UL BWP.

If $\mu_{AI,DL} < \mu_{AI,UL}$: for each DCI format 2_5 AI-index field payload group of length $2^{(\mu_{AI,UL}-\mu_{AI,DL})}+1$, the first value for the combination of availability indication values are applicable to the reference DL BWP and the next $2^{(\mu_{AI,DL}-\mu_{AI,UL})}$ values are applicable to the reference UL BWP.

Option 2-2: DCI format 2_5 payload carries UL payload after all DL indication finished If $\mu_{AI,DL} \geq \mu_{AI,UL}$: separate the DCI format 2_5 payload size PSize into two parts, the first $\lfloor PSize*2^{(\mu_{AI,DL}-\mu_{AI,UL})}/(2^{(\mu_{AI,DL}-\mu_{AI,UL})}+1) \rfloor$ values apply for DL BWP, the next $\lfloor PSize/(2^{(\mu_{AI,DL}-\mu_{AI,UL})}+1) \rfloor$ values apply for UL BWP.

If $\mu_{AI,DL} < \mu_{AI,UL}$: separate the DCI format 2_5 payload size PSize into two parts, the first $\lfloor PSize/(2^{(\mu_{AI,UL}-\mu_{AI,DL})}+1) \rfloor$ values apply for DL BWP, the next $\lfloor PSize*2^{(\mu_{AI,UL}-\mu_{AI,DL})}/(2^{(\mu_{AI,UL}-\mu_{AI,DL})}+1) \rfloor$ values apply for UL BWP.

Mechanism 3: Extend soft resource availability value from 0-7 to 0-15

Example 3 may include a method of an integrated access and backhaul (IAB) distributed unit (DU), the method comprising: receiving configuration information that includes an indication of a reference subcarrier spacing (SCS) for dynamic soft resource availability indication; receiving a downlink control information (DCI) that includes an availability indication; and determining downlink, uplink, or flexible resources that are available based on the DCI and the reference SCS.

Example 4 may include the method of example 3 or some other example herein, wherein the DCI is a DCI format 2_5.

Example 5 may include the method of example 3-4 or some other example herein, wherein the reference SCS is received in an AvailabilityCombinationsPerCell information element via radio resource control (RRC) signaling.

Example 6 may include the method of example 3-5 or some other example herein, wherein receiving the DCI includes monitoring for the DCI in a common search space.

Example 7 may include the method of example 3-6 or some other example herein, wherein the reference SCS is a first reference SCS for a first frequency carrier, and wherein the configuration information further includes a second reference SCS for dynamic soft resource availability indication associated with a second frequency carrier.

Example 8 may include the method of example 7 or some other example herein, wherein the first frequency carrier is a time domain duplex (TDD) carrier and the second frequency carrier is a supplemental uplink carrier.

Example 9 may include the method of example 7 or some other example herein, wherein the first and second carriers are paired spectrum for frequency domain duplex (FDD) communication.

Example 10 may include the method of example 3-9 or some other example herein, wherein the availability indication includes a plurality of availability indication values to indicate availability of corresponding sets of resources.

Example 11 may include the method of example 10 or some other example herein, wherein individual availability indication values apply to $2^{(\mu-\mu_{AI})}$ consecutive slots in an active downlink (DL) bandwidth part (BWP) or an active uplink (UL) BWP, wherein an earliest slot of the consecutive slots starts at a same time as an earliest slot of an SCS configuration of the reference SCS.

Example 12 may include the method of example 3-11 or some other example herein, wherein the availability indication includes a first set of availability indication values for a DL BWP and a second set of availability indication values for an UL BWP.

Example 13 may include the method of example 12 or some other example herein, wherein the reference SCS is a first reference SCS for the first set of availability indication values for the DL BWP, and wherein the configuration information further includes a second reference SCS for the second set of availability indication values for the UL BWP.

Example 14 may include the method of example 12-13 or some other example herein, wherein, if $\mu_{AI,DL} \geq \mu_{AI,UL}$: for each $2^{(\mu_{AI,DL}-\mu_{AI,UL})}+1$ values provided by the dynamic soft resource availability indication, the first $2^{(\mu_{AI,DL}-\mu_{AI,UL})}$ values are applicable to the DL BWP and the next value is applicable to the UL BWP.

Example 15 may include the method of example 12-14 or some other example herein, wherein, if $\mu_{AI,DL} < \mu_{AI,UL}$: for each $2^{(\mu_{AI,UL}-\mu_{AI,DL})}+1$ values provided by the availability indication, the first value is applicable to the DL BWP and the next $2^{(\mu_{AI,DL}-\mu_{AI,UL})}$ values are applicable to the UL BWP.

Example 16 may include the method of example 12-15 or some other example herein, wherein the DCI includes the first and second sets of availability indication values are included in separate payloads in the DCI.

Example 17 may include the method of example 3-11 or some other example herein, wherein the DCI is a first DCI, wherein the availability indication is a first availability indication for a DL BWP, and wherein the method further comprises receiving a second DCI with a second availability indication for an UL BWP.

Example 18 may include a method comprising: encoding, for transmission to an integrated access and backhaul (IAB) distributed unit (DU), configuration information to indicate a reference subcarrier spacing (SC S) to be used for dynamic soft availability indication; and encoding, for transmission to the IAB DU, a downlink control information (DCI) that includes an availability indication to indicate downlink, uplink, or flexible resources that are available based on the reference SCS.

Example 19 may include the method of example 18 or some other example herein, wherein the DCI is a DCI format 2_5.

Example 20 may include the method of example 18-19 or some other example herein, wherein the reference SCS is included in an AvailabilityCombinationsPerCell information element transmitted via radio resource control (RRC) signaling.

Example 21 may include the method of example 18-20 or some other example herein, wherein the DCI is transmitted in a common search space.

Example 22 may include the method of example 18-21 or some other example herein, wherein the reference SCS is a first reference SCS for a first frequency carrier, and wherein the configuration information further includes a second reference SCS for dynamic soft resource availability indication associated with a second frequency carrier.

Example 23 may include the method of example 22 or some other example herein, wherein the first frequency carrier is a time domain duplex (TDD) carrier and the second frequency carrier is a supplemental uplink carrier.

Example 24 may include the method of example 22 or some other example herein, wherein the first and second carriers are paired spectrum for frequency domain duplex (FDD) communication.

Example 25 may include the method of example 18-24 or some other example herein, wherein the availability indication includes a plurality of availability indication values to indicate availability of corresponding sets of resources.

Example 26 may include the method of example 25 or some other example herein, wherein individual availability indication values apply to $2^{(\mu-\mu_{AI})}$ consecutive slots in an active downlink (DL) bandwidth part (BWP) or an active uplink (UL) BWP, wherein an earliest slot of the consecutive slots starts at a same time as an earliest slot of an SCS configuration of the reference SCS.

Example 27 may include the method of example 18-26 or some other example herein, wherein the availability indication includes a first set of availability indication values for a DL BWP and a second set of availability indication values for an UL BWP.

Example 28 may include the method of example 27 or some other example herein, wherein the reference SCS is a first reference SCS for the first set of availability indication values for the DL BWP, and wherein the configuration information further includes a second reference SCS for the second set of availability indication values for the UL BWP.

Example 29 may include the method of example 27-28 or some other example herein, wherein, if $\mu_{AI,DL} \geq \mu_{AI,UL}$: for each $2^{(\mu_{AI,DL}-\mu_{AI,UL})}+1$ values provided by the availability indication, the first $2^{(\mu_{AI,DL}-\mu_{AI,UL})}$ values are applicable to the DL BWP and the next value is applicable to the UL BWP.

Example 30 may include the method of example 27-29 or some other example herein, wherein, if $\mu_{AI,DL} < \mu_{AI,UL}$: for each $2^{(\mu_{AI,UL}-\mu_{AI,DL})}+1$ values provided by the availability indication, the first value is applicable to the DL BWP and the next $2^{(\mu_{AI,DL}-\mu_{AI,UL})}$ values are applicable to the UL BWP.

Example 31 may include the method of example 27-30 or some other example herein, wherein the first and second sets of availability indication values are included in separate payloads in the DCI.

Example 32 may include the method of example 18-26 or some other example herein, wherein the DCI is a first DCI, wherein the dynamic soft resource availability indication is a first availability indication for a DL BWP, and wherein the method further comprises receiving a second DCI with a second availability indication for an UL BWP.

Example 33 may include the method of example 18-32 or some other example herein, wherein the method is performed by a parent IAB node, a non-IAB gNB, or a portion thereof.

Example 34 may include the method of example 33 or some other example herein, wherein the parent IAB node is a donor node or another IAB node.

Example 35 may include a method of an integrated access and backhaul (IAB) distributed unit (DU), the method comprising: receiving a dynamic soft availability indication that includes a first set of one or more availability indication values for a downlink (DL) bandwidth part (BWP) and a second set of one or more availability indication values for an uplink (UL) bandwidth part (BWP); determining downlink or flexible resources of the DL BWP that are available based on the first set of one or more availability indication values; determining uplink or flexible resources of the UL BWP that are available based on the second set of one or more availability indication values; and communicating on the DL BWP and the UL BWP based on the respective determinations.

Example 36 may include the method of example 35 or some other example herein, further comprising receiving a first reference subcarrier spacing (SCS) $\mu_{AI,DL}$ for the DL BW and a second reference SCS for the UL BW to use for the dynamic soft availability indication.

Example 37 may include the method of example 36 or some other example herein, wherein if $\mu_{AI,DL} \geq \mu_{AI,UL}$, for $2^{(\mu_{AI,DL}-\mu_{AI,UL})}+1$ values of the dynamic soft resource availability indication, a first $2^{(\mu_{AI,DL}-\mu_{AI,UL})}$ values are applicable to the DL BWP and a next value is applicable to the UL BWP.

Example 38 may include the method of example 36-37 or some other example herein, wherein if $\mu_{AI,DL} < \mu_{AI,UL}$, for $2^{(\mu_{AI,UL}-\mu_{AI,DL})}+1$ values of the dynamic soft resource availability indication, a first value is applicable to the DL BWP and a next $2^{(\mu_{AI,DL}-\mu_{AI,UL})}$ values are applicable to the UL BWP.

Example 39 may include the method of example 35-38 or some other example herein, wherein the first and second sets of availability indication values are included in separate payloads in the DCI.

Example 40 may include the method of example 35-39 or some other example herein, wherein the DCI is a DCI format 2_5.

Example 41 may include the method of example 36-40 or some other example herein, wherein the first and second reference SCSs are included in an AvailabilityCombinationsPerCell information element received via radio resource control (RRC) signaling.

Example 42 may include the method of example 35-41 or some other example herein, wherein receiving the DCI includes monitoring for the DCI in a common search space.

Example 43 may include an apparatus comprising means to perform one or more elements of a method described in or related to any of examples 1-42, or any other method or process described herein.

Example 44 may include one or more non-transitory computer-readable media comprising instructions to cause an electronic device, upon execution of the instructions by one or more processors of the electronic device, to perform one or more elements of a method described in or related to any of examples 1-42, or any other method or process described herein.

Example 45 may include an apparatus comprising logic, modules, or circuitry to perform one or more elements of a method described in or related to any of examples 1-42, or any other method or process described herein.

Example 46 may include a method, technique, or process as described in or related to any of examples 1-42, or portions or parts thereof.

Example 47 may include an apparatus comprising: one or more processors and one or more computer-readable media comprising instructions that, when executed by the one or more processors, cause the one or more processors to perform the method, techniques, or process as described in or related to any of examples 1-42, or portions thereof.

Example 48 may include a signal as described in or related to any of examples 1-42, or portions or parts thereof.

Example 49 may include a datagram, packet, frame, segment, protocol data unit (PDU), or message as described in or related to any of examples 1-42, or portions or parts thereof, or otherwise described in the present disclosure.

Example 50 may include a signal encoded with data as described in or related to any of examples 1-42, or portions or parts thereof, or otherwise described in the present disclosure.

Example 51 may include a signal encoded with a datagram, packet, frame, segment, protocol data unit (PDU), or message as described in or related to any of examples 1-42, or portions or parts thereof, or otherwise described in the present disclosure.

Example 52 may include an electromagnetic signal carrying computer-readable instructions, wherein execution of the computer-readable instructions by one or more processors is to cause the one or more processors to perform the method, techniques, or process as described in or related to any of examples 1-42, or portions thereof.

Example 53 may include a computer program comprising instructions, wherein execution of the program by a processing element is to cause the processing element to carry out the method, techniques, or process as described in or related to any of examples 1-42, or portions thereof.

Example 54 may include a signal in a wireless network as shown and described herein.

Example 55 may include a method of communicating in a wireless network as shown and described herein.

Example 56 may include a system for providing wireless communication as shown and described herein.

Example 57 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Terminology

For the purposes of the present document, the following terms and definitions are applicable to the examples and embodiments discussed herein.

Unless used differently herein, terms, definitions, and abbreviations may be consistent with terms, definitions, and abbreviations defined in 3GPP TR 21.905 v16.0.0 (2019 June).

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. Processing circuitry may include one or more processing cores to execute instructions and one or more memory structures to store program and data information. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. Processing circuitry may include more hardware accelerators, which may be microprocessors, programmable processing devices, or the like. The one or more hardware accelerators may include, for example, computer vision (CV) and/or deep learning (DL) accelerators. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or link, and/or the like.

The term "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term "a Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/.

The term "Special Cell" refers to the PCell of the MCG or the PSCell of the SCG for DC operation; otherwise, the term "Special Cell" refers to the Pcell.

The invention claimed is:

1. One or more non-transitory computer-readable media (NTCRM) having instructions, stored thereon, that when executed by one or more processors cause an integrated access and backhaul (IAB) distributed unit (DU) to:
receive, in an AvailabilityCombinationsPerCell information element via radio resource control (RRC) signaling, configuration information that includes an indication of a reference subcarrier spacing (SCS) for dynamic soft resource availability indication;
receive a downlink control information (DCI) with a DCI format 2_5 that includes an availability indication; and
determine downlink, uplink, or flexible resources that are available based on the availability indication and the reference SCS.

2. The one or more NTCRM of claim 1, wherein, to receive the DCI, the IAB DU is to monitor for the DCI in a common search space.

3. The one or more NTCRM of claim 1, wherein the reference SCS is a first reference SCS for a first frequency carrier, and wherein the configuration information further includes a second reference SCS for dynamic soft resource availability indication associated with a second frequency carrier.

4. The one or more NTCRM of claim 3, wherein the first frequency carrier is a time domain duplex (TDD) carrier and the second frequency carrier is a supplemental uplink carrier.

5. The one or more NTCRM of claim 3, wherein the first and second carriers are paired spectrum for frequency domain duplex (FDD) communication.

6. The one or more NTCRM of claim 1, wherein the availability indication includes a plurality of availability indication values to indicate availability of corresponding resources, wherein individual availability indication values apply to $2\textasciicircum((\mu-\mu\_AI))$ consecutive slots in an active downlink (DL) bandwidth part (BWP) or an active uplink (UL) BWP, wherein an earliest slot of the consecutive slots starts at a same time as an earliest slot of an SCS configuration of the reference SCS, wherein $\mu$ is an SCS configuration of the active DL BWP or active UL BWP, and wherein $\mu\_AI$ is the reference SCS.

7. The one or more NTCRM of claim 1, wherein the availability indication includes a first set of availability indication values for a DL BWP and a second set of availability indication values for a UL BWP.

8. One or more non-transitory computer-readable media (NTCRM) having instructions, stored thereon, that when executed by one or more processors cause a device to:
    encode, for transmission to an integrated access and backhaul (IAB) distributed unit (DU), configuration information that includes an indication of a reference subcarrier spacing (SCS) for a dynamic soft resource availability indication, wherein the reference SCS is included in an AvailabilityCombinationsPerCell information element transmitted via radio resource control (RRC) signaling; and
    encode, for transmission to the IAB DU, a downlink control information (DCI) that includes an availability indication to indicate downlink, uplink, or flexible resources that are available based on the reference SCS.

9. The one or more NTCRM of claim 8, wherein the DCI is transmitted in a common search space.

10. The one or more NTCRM of claim 8, wherein the reference SCS is a first reference SCS for a first frequency carrier, and wherein the configuration information further includes a second reference SCS for dynamic soft resource availability indication associated with a second frequency carrier.

11. The one or more NTCRM of claim 10, wherein the first frequency carrier is a time domain duplex (TDD) carrier and the second frequency carrier is a supplemental uplink carrier.

12. The one or more NTCRM of claim 10, wherein the first and second carriers are paired spectrum for frequency domain duplex (FDD) communication.

13. The one or more NTCRM of claim 8, wherein the availability indication includes a plurality of availability indication values to indicate availability of corresponding resources, wherein individual availability indication values apply to $2\textasciicircum((\mu-\mu\_AI))$ consecutive slots in an active downlink (DL) bandwidth part (BWP) or an active uplink (UL) BWP, wherein an earliest slot of the consecutive slots starts at a same time as an earliest slot of an SCS configuration of the reference SCS, wherein $\mu$ is an SCS configuration of the active DL BWP or active UL BWP, and wherein $\mu\_AI$ is the reference SCS.

14. The one or more NTCRM of claim 8, wherein the availability indication includes a first set of availability indication values for a DL BWP and a second set of availability indication values for a UL BWP.

15. The one or more NTCRM of claim 8, wherein the DCI is a DCI format 2_5.

16. The one or more NTCRM of claim 8, wherein the device is a parent IAB node or a non-IAB next generation NodeB (gNB).

* * * * *